Figure 1:
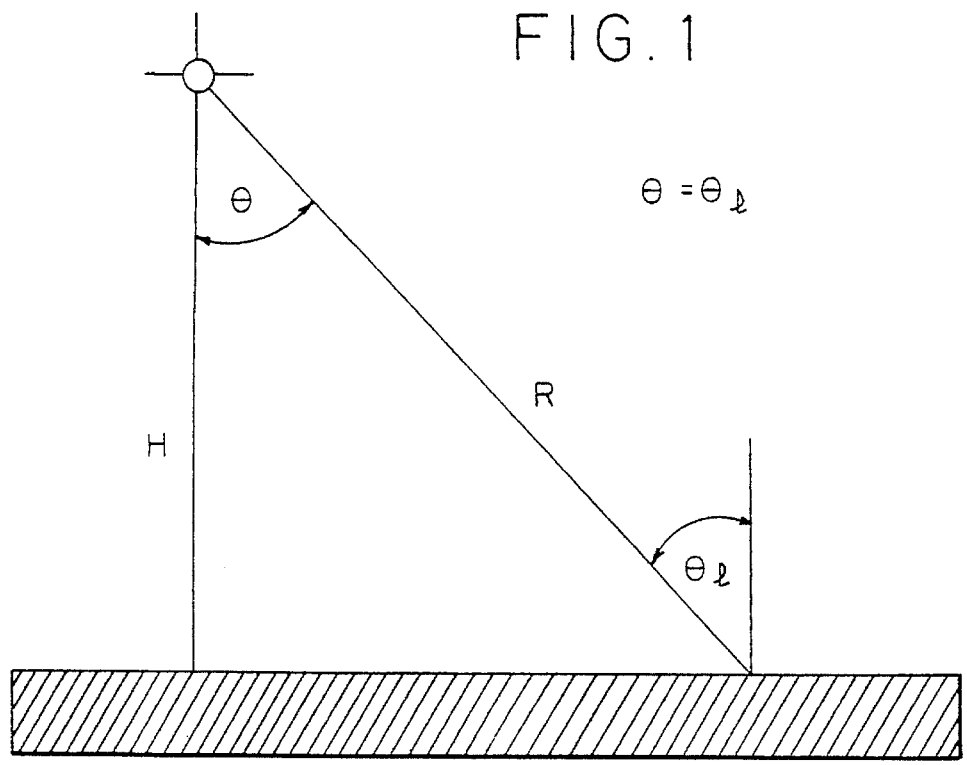

United States Patent [19]

Zink et al.

[11] Patent Number: 5,489,907
[45] Date of Patent: Feb. 6, 1996

[54] AIRBORNE SAR SYSTEM FOR DETERMINING THE TOPOGRAPHY OF A TERRAIN

[75] Inventors: Manfred Zink, Wessling; Herwig Öttl, Germering, both of Germany; Anthony Freeman, Pasadena, Calif.

[73] Assignee: Deutsche Forschungsanstalt für luft- und Raumfahrt e.V., Köln, Germany

[21] Appl. No.: 311,743

[22] Filed: Sep. 23, 1994

[30] Foreign Application Priority Data

Sep. 24, 1993 [DE] Germany .................. 43 32 590.4

[51] Int. Cl.$^6$ .................................................. G01S 13/90
[52] U.S. Cl. .................................................. 342/25
[58] Field of Search ........................... 342/25, 191

[56] References Cited

U.S. PATENT DOCUMENTS

| | | | |
|---|---|---|---|
| 4,321,601 | 3/1982 | Richman | 342/25 |
| 4,387,373 | 6/1983 | Longuemare, Jr. | 342/25 |
| 4,758,843 | 7/1988 | Agrawal et al. | 343/814 |
| 4,978,960 | 12/1990 | Newcomb et al. | 342/25 |
| 4,978,961 | 12/1990 | Williams et al. | 342/25 |
| 5,189,424 | 2/1993 | Brown | 342/25 |
| 5,206,708 | 11/1993 | Auterman | 342/25 |

OTHER PUBLICATIONS

Zebker, Howard A. et al. "Topograhic Mapping from Interferometric Synthetic Aperture Radar Observations." Journal of Geophysical Research, vol. 91, No. B5, pp. 4993–4999, Apr. 10, 1986.

Goldstein, Richard M. "Satellite radar interfermoetry: Two–dimensional phase unwrapping." Radio Science, vol. 23, No. 4, pp. 713–720, Jul.–Aug. 1988.

*Primary Examiner*—Daniel T. Pihulic
*Attorney, Agent, or Firm*—Browdy and Neimark

[57] ABSTRACT

In an airborne SAR system for determining the topography of a terrain, two complete, correlated SAR images with different amplitude modulation in the cross-track direction are obtained and recorded by switching of two antenna patterns which can be generated by means of a monopulse antenna. The desired terrain information is extracted from the amplitude relationship of the two SAR images.

It is furthermore possible to extract the terrain information from polarimetric SAR data via crosstalk parameters.

3 Claims, 6 Drawing Sheets

$\theta = \theta_\ell$

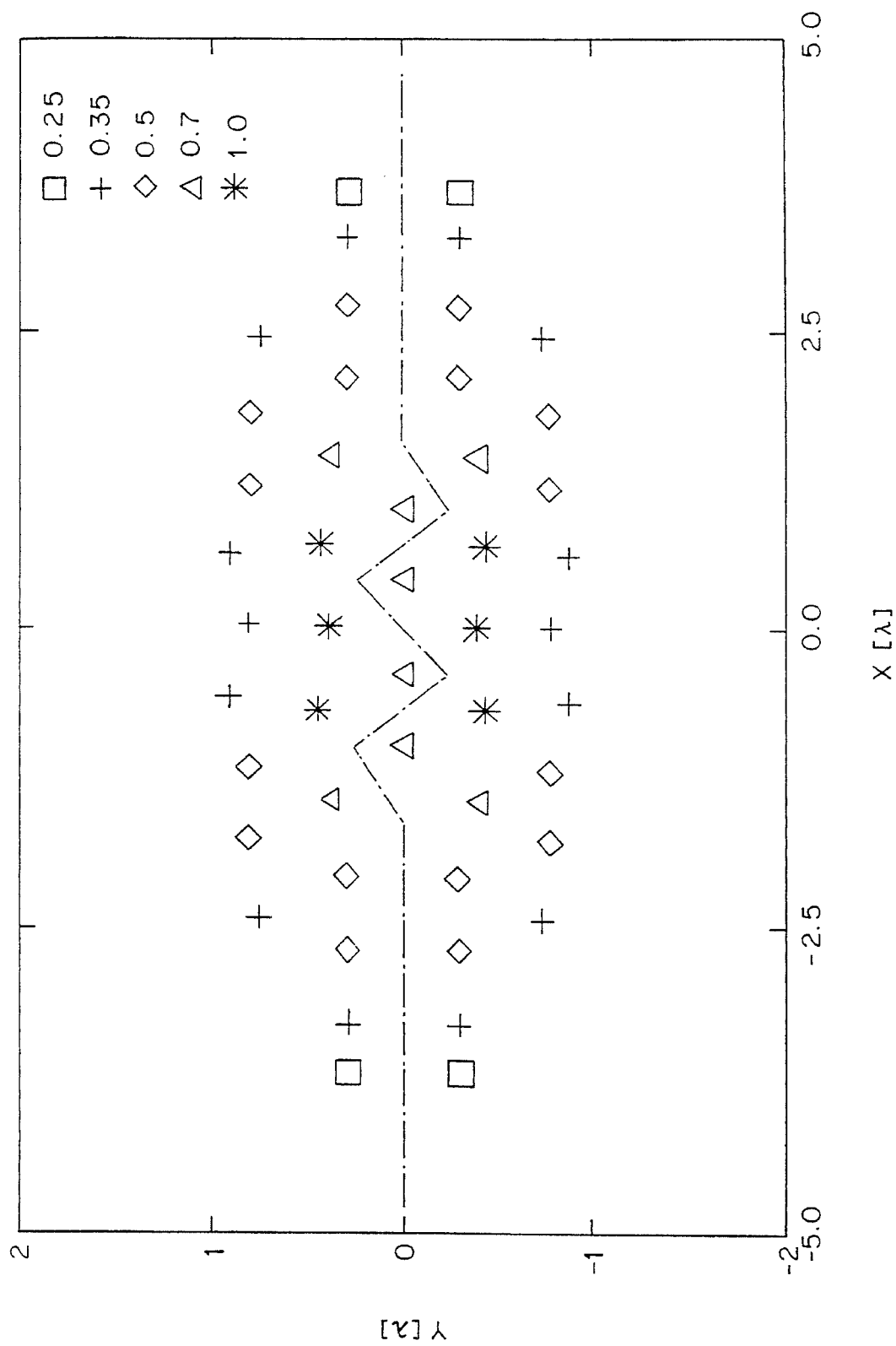

the phase difference between two SAR images of one and the same area. Digital terrain data with a sufficiently fine resolution are today only available of certain areas of the earth's surface. In case DEM data are available, there is the additional problem of finding suitable tie points. However, such a superposition process is labor-intensive and costly.

AIRBORNE SAR SYSTEM FOR DETERMINING THE TOPOGRAPHY OF A TERRAIN

The invention relates to an airborne SAR (Synthetic Aperture Radar) system for determining the topography of a terrain.

The mean image output $P_i$ of SAR images of distributed targets is dependent on the antenna gain G and the sine of the local angle of incidence $\theta_i$ in the formula:

$$P_i - \frac{G^2(\theta)}{\sin(\theta_i)}$$

In this case the angle $\theta$ corresponds to the nadir angle of a defined image element. A correction of a system-conditional, radiometric modulation of SAR data requires the exact knowledge of the nadir angle and a local terrain slope.

Customarily an SAR system is a side-looking radar, i.e. the antenna beam direction is perpendicular to the flight path. In this case a clear Doppler shift is generated for each image point. If an attempt is made to determine data in the direction of flight, i.e. in the direction of the velocity vector, by means of the SAR system, points with the same Doppler shift appear to the left and right of the flight path. This ambiguity can be overcome with a monopulse antenna, for example, as described in U.S. Pat. No. 4,978,961.

However, in this case the monopulse technique is applied in the horizontal plane, i.e. on the azimuth direction. It is known that the monopulse antenna generates a sum and a difference pattern in this case (see U.S. Pat. No. 4,758,843).

For mapping flat terrain (see FIG. 1), the nadir angle and the local incidence angle are identical and can be calculated from the flight altitude and slant range to individual image points. With mountainous terrain (see FIG. 2) it is necessary to take elevation variations into consideration in order to compensate the actually effective antenna gain for each image element. This difficulty primarily occurs in airborne systems, but has a lesser effect on spaceborne sensors because of the greater altitude.

Radar backscattering coefficients are measured radar cross-sections normalized by the ground area of an image pixel. Because of the slant range imaging geometry it is necessary to project the pixel area from slant range to ground range coordinates. However, the projection requires a knowledge of the local incidence angle which can only be calculated with the use of appropriate exact topographic data. This problem applies equally to both airborne and spaceborne systems.

Digital terrain models, so-called digital elevation models (DEM), are a possible source for the elevation information. (F. W. Leberl, "Radargrammetric Image Processing", Artech House, 1990). The superposition or a so-called registration of a SAR image and the associated terrain model requires a great effort because of the slant range geometry of the radar.

Methods have been developed to avoid the mentioned problems of the registration of SAR images and elevation models, by means of which the elevation information can be extracted from SAR data which were mapped with the sam imaging geometry. The inferometric SAR represents a method developed for this (see H. A. Zebker and R. M. Goldstein, "Topographic Mapping from Inferometric Synthetic Aperture Radar Observation", Journal of Geophysical Research, Vol. 91, No. 55, April 1986, pp 4993 to 4999; R. M. Goldstein, H. A. Zebker and C. Werner, "Satellite Radar Interferometry: Two-Dimensional Phase Unwrapping", Radio Science, Vol. 23, No. 4, 1988, pp 713 to 720). With this method the topography of an area is determined from the It requires a considerable effort in design as well as in the realization of such a sensor and the subsequent handling, the so-called processing, of the image data in order to be able to measure absolute phases in the interferometric SAR radar as exactly as possible. The conversion of the basically ambiguous phase difference into definite relief data is also problematical.

It is therefore the object of the invention to provide an airborne SAR system for determining the topography of a terrain wherein no elaborate phase measurements are required.

In accordance with the invention this has been attained in an airborne SAR system for determining the topography of a terrain by the features in claim 1. Advantageous further developments are the subject of claims directly or indirectly dependent from claim 1.

In accordance with the invention this has been attained in an airborne SAR system for determining the topography of a terrain in that by using two switchable antenna patterns, which can be generated by means of a monopulse antenna, two completely correlated SAR images of different amplitude modulation in the cross-track direction are obtained and registered, and that the desired terrain information is extracted from the amplitude relationship of the two SAR images, for example by means of an amplitude interferometer. In this case the antenna patterns generated by means of the monopulse antenna are a sum and a difference pattern.

In accordance with an advantageous further development of the airborne SAR system it is also possible to extract the terrain information from the polarimetric SAR data by means of cross-talk parameters.

In accordance with a preferred embodiment of the invention, a monopulse antenna is formed from a plurality of individual radiators. In the process, the number of individual radiators in the elevation direction in respect to an imaginary antenna center, into which the zero point of an orthogonal coordinate system having a X- and a Y-axis has been placed, is divided into upper and lower halves which are essentially mirror-symmetrical in relation to the X-axis. To generate a sum and a difference pattern, individual radiators in the upper and the lower antenna halves are fed in phase or 180° out of phase.

Thus, two images of one and the same area are necessary for realizing an amplitude interferometer, which are modulated in the elevation direction with different antenna patterns, namely a sum pattern and a difference pattern. If now an image is generated from the quotient of these two original images, the image resulting therefrom has a modulation which is a function of the antenna angle and corresponds to the relationship of the two antenna patterns. From a knowledge of the antenna angle the nadir angle is derived and from this, adding the measured and therefore exactly known slant range, the flight altitude above the respective image area.

If the flight altitude above mean sea level (m.s.l.) or the absolute altitude of an image element is known, the map of flight altitudes can be inverted and results in a topographic map in the slant range geometry of the radar. The use of two switchable antenna patterns in radar direction finding is known by the term "monopulse system" (S. M. Sherman, "Monopulse Principles and Techniques", Artech House, 1984).

However, SAR data have been calibrated absolutely radiometrically only in recent years. Needed for this are the topography or methods for determining it. But the imaging and not the determination of elevation information continues to remain in the foreground.

Figure 2:
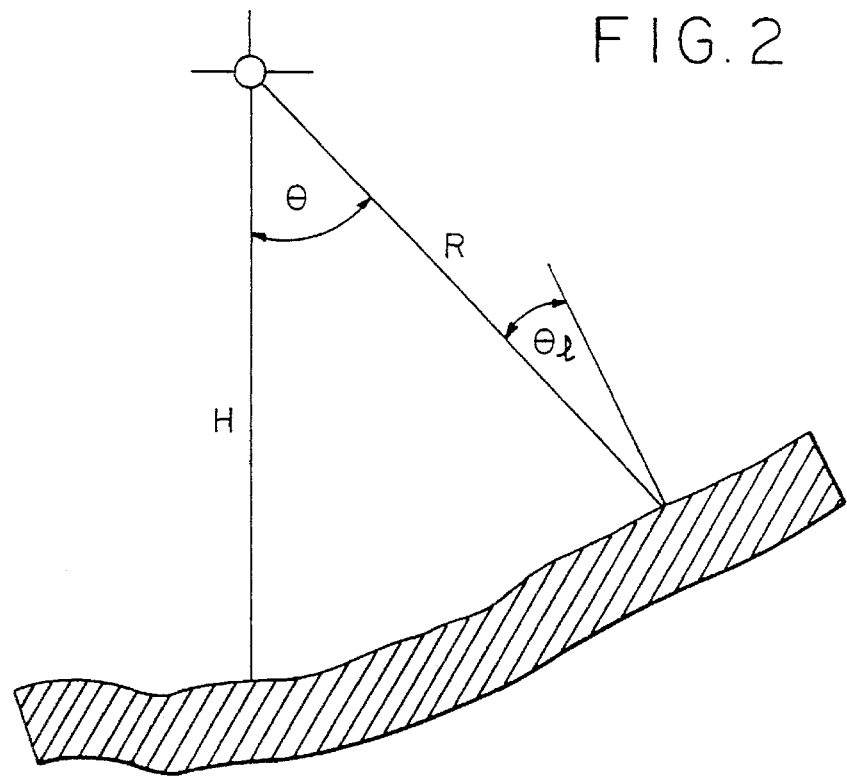
Figure 3:
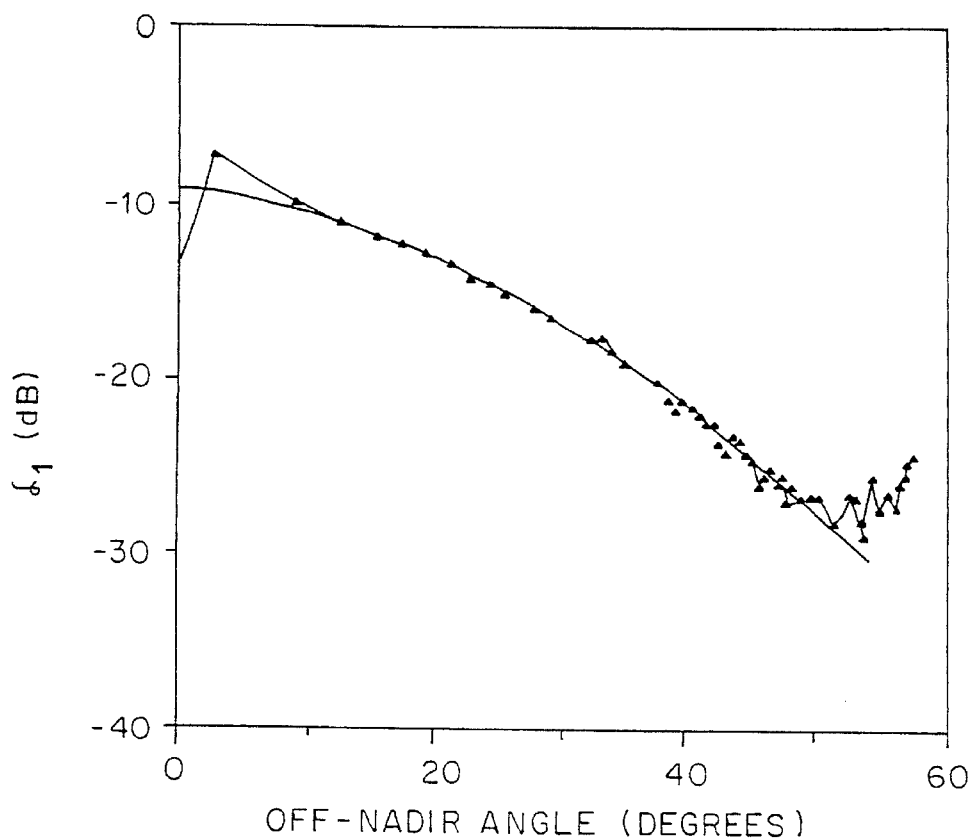
Figure 5:
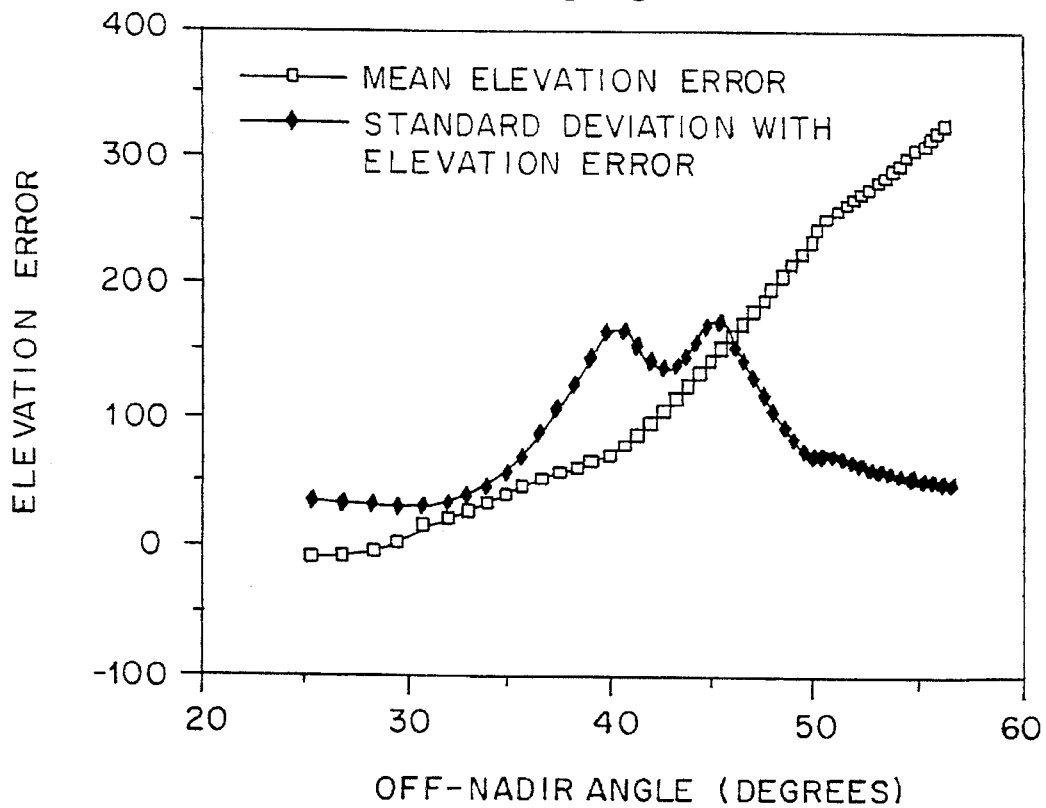
Figure 4A:
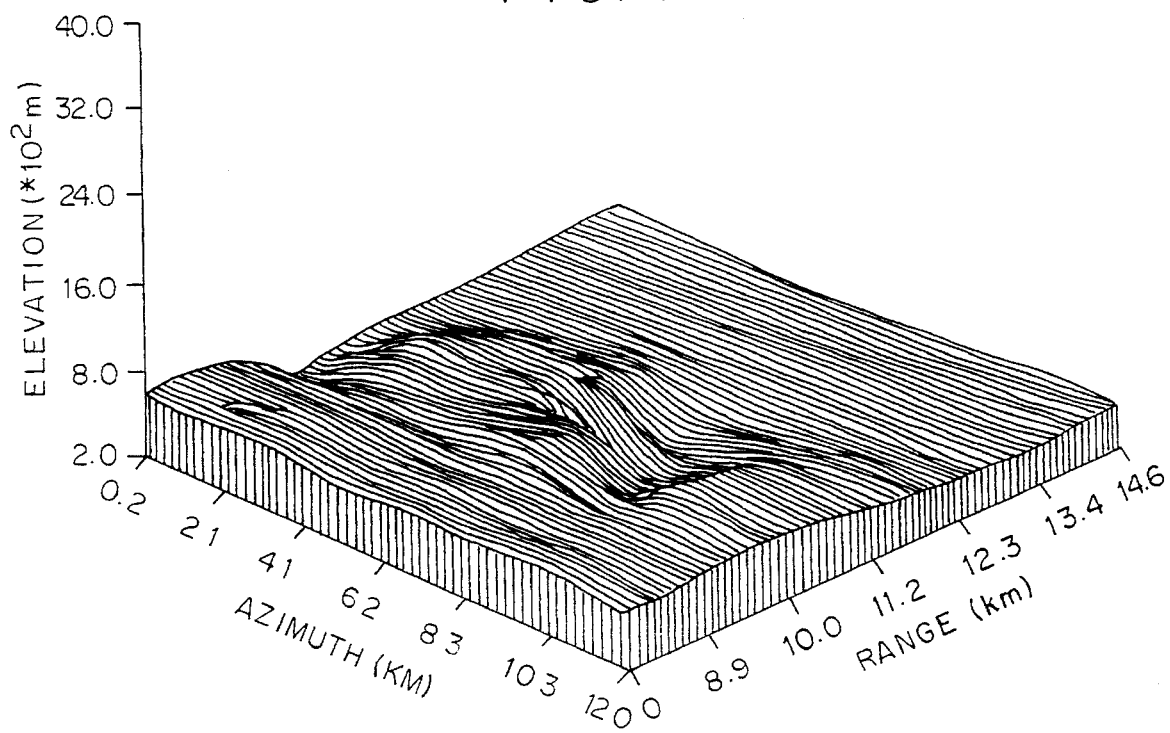
Figure 4B:
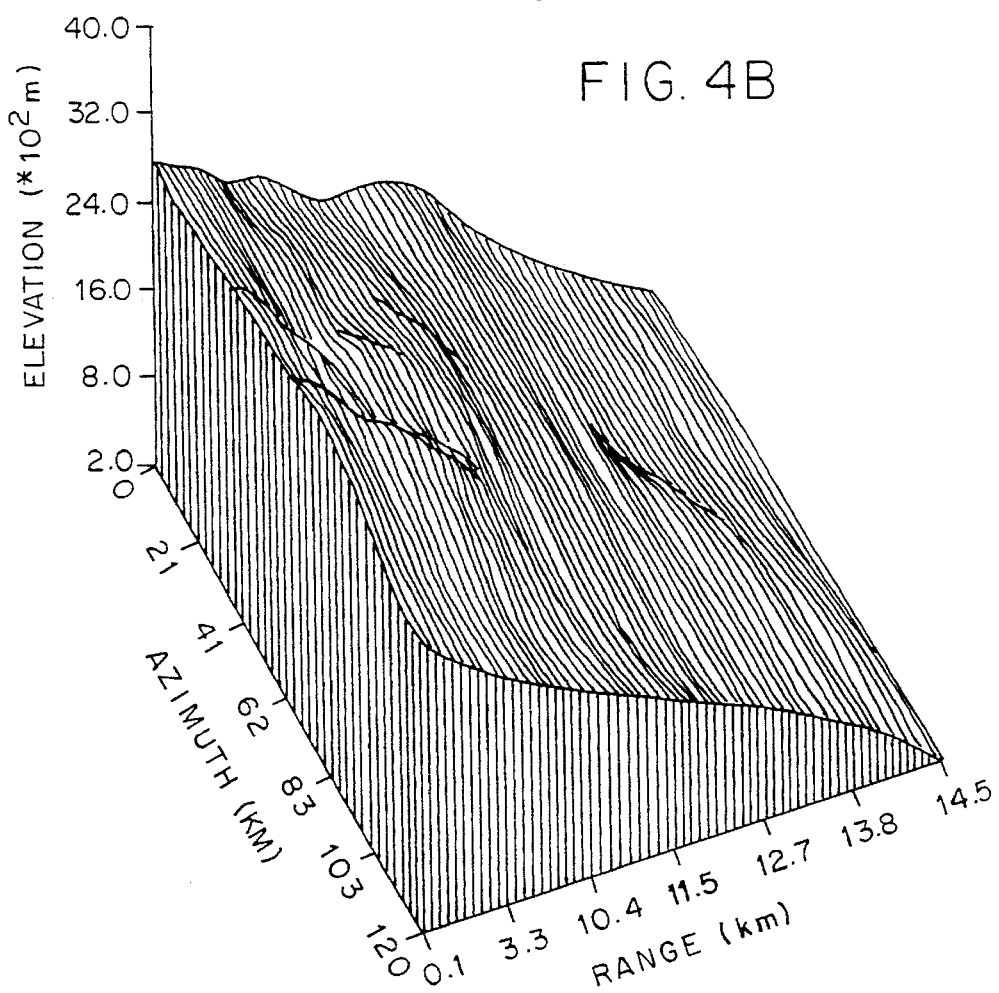
Figure 7:
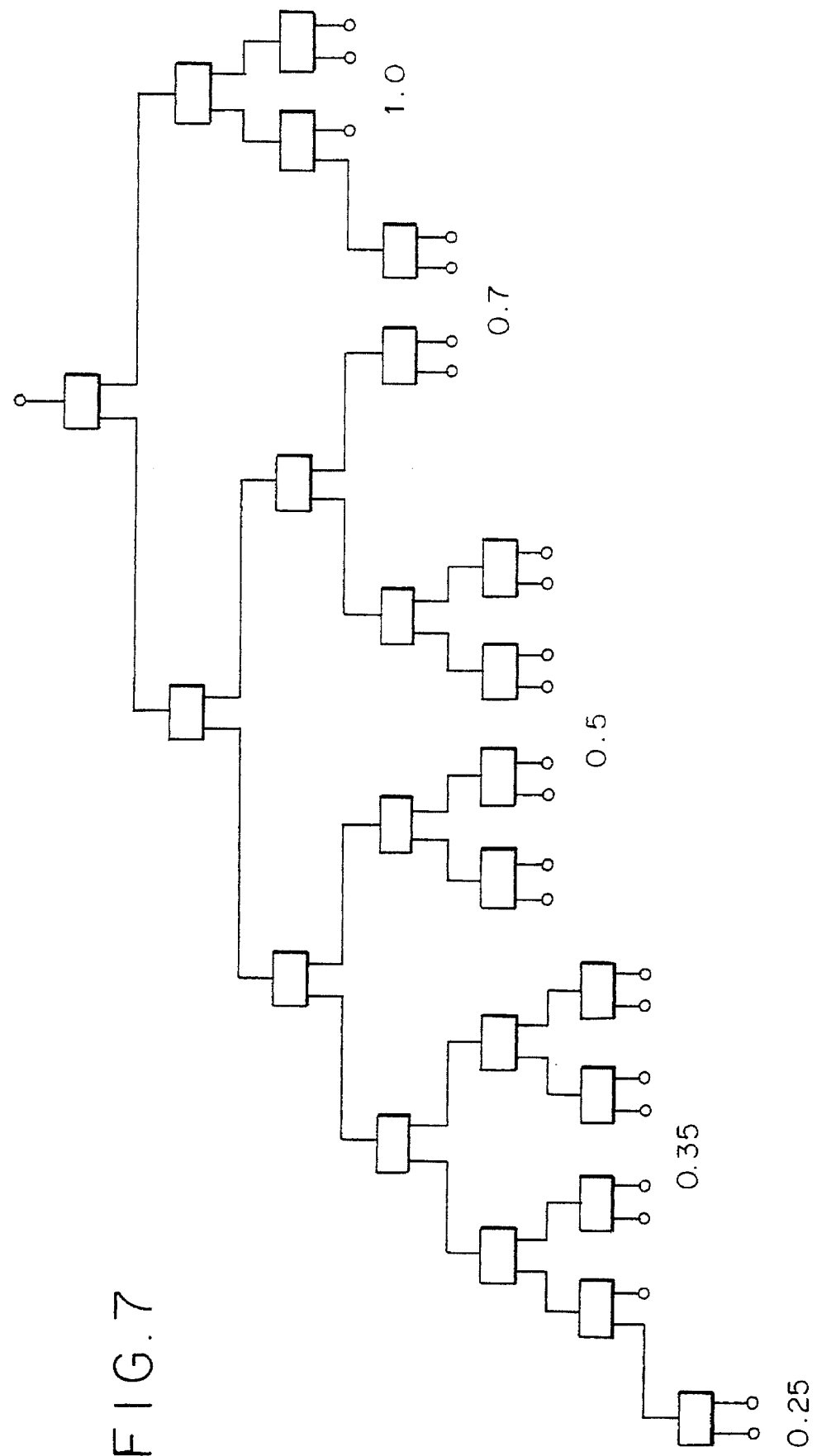
Figure 8:
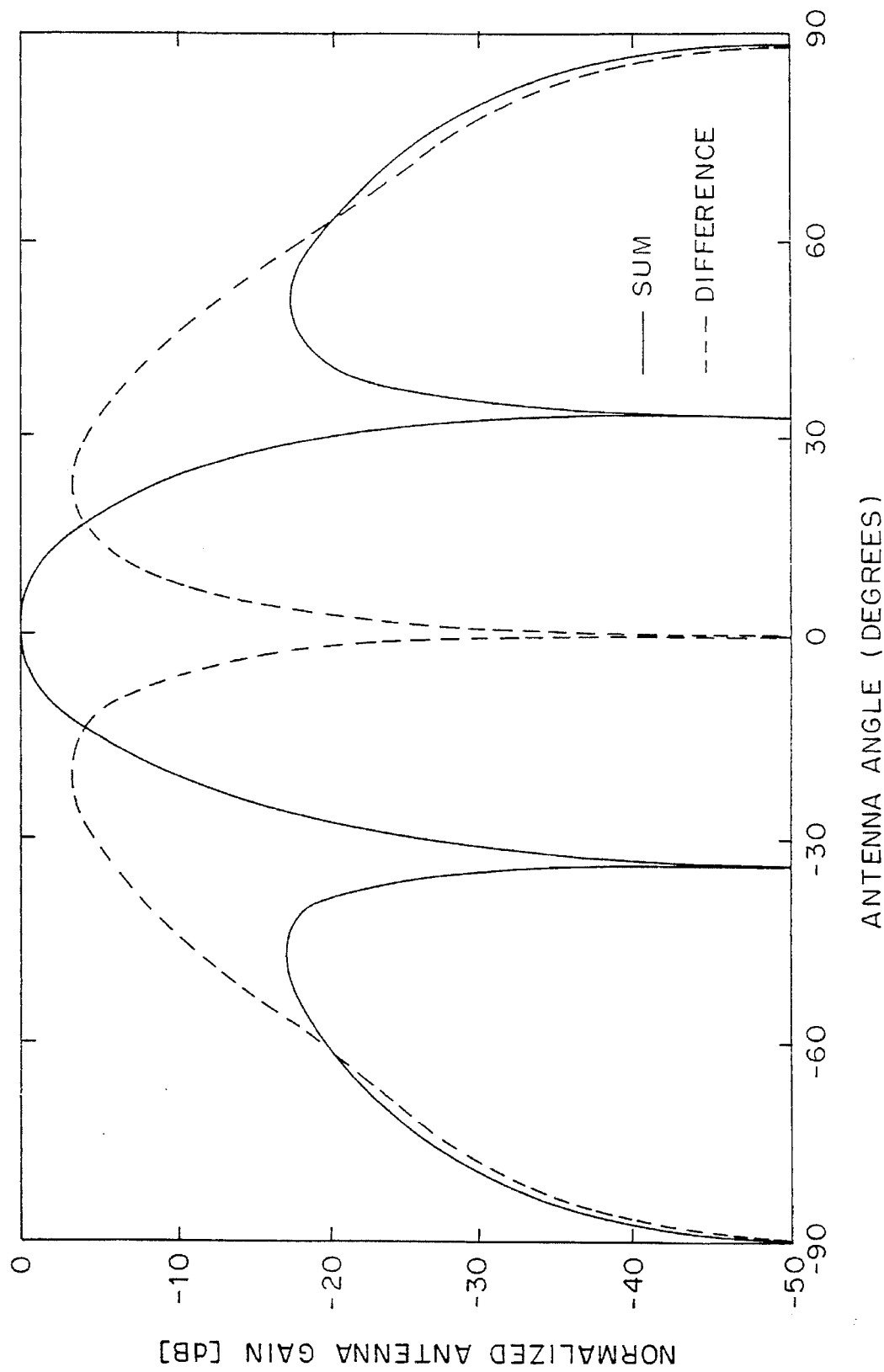

The invention will be described in detail below by means of preferred embodiments and by means of an application making reference to the attached drawings. Shown are in:

FIG. 1, a geometric representation of a flat surface of the earth which is plane to a large degree;

FIG. 2, geometric representation of a mountainous terrain;

FIG. 3, a graph of a crosstalk parameter ($\delta_i$) and an fitted reference function;

FIG. 4A, the topography derived from polarimetric data for Oberpfaffenhofen, and therefore a flat area;

FIG. 4B, the topography derived from polarimetric data for "Death Valley", i.e. a mountainous area;

FIG. 5, a pattern representation in which elevation errors in the elevation determination are shown, which are obtained from the dataa derived from the Oberpfaffenhofen area;

FIG. 6; a schematic representation of an arrangement of individual radiators of a monopulse antenna indicated by different symbols;

FIG. 7, a schematic representation of a feed network of a monopulse antenna, and FIG. 8, sum and difference pattern of a monopulse antenna, wherein a normalized antenna gain (dB) is plotted over the antenna angle (in degrees).

First, the use of the monopulse technique with polarimetric SAR systems will be described. With polarimetric SAR systems a too small suppression of cross-polarization of the SAR antenna can be used to determine the nadir angle. This effect, which occurs strongest in the L-band of the DC-8 SAR system operated by NASA/JPL, leads to an undesired cross-talk of the signals from the horizontally into the vertically polarized channel and vice versa.

In the process the crosstalk shows a dependence from the antenna angle which corresponds to the relationship between co-polar and cross-polar antenna gain. In this case the different modulations therefore are a result on the one hand of the co-polar and on the other hand the cross-polar antenna patterns. The cross-polar pattern is not a clearly defined function and therefore cannot be directly determined. But crosstalk can be represented by two parameters in a system model.

If the represented area meets defined statistical requirements, these parameters can be determined in accordance with a method which is described by J. J. van Zyl in "Calibration of Polarimetric Radar Images Using Only Image Parameters and Trihedral Corner Reflector Responses", which was published in IEEE Trans. on Geoscience and Remote Sensing, Vol. 28, No. 3, May 1990, pp 337 to 348.

For one use, applicant has employed a L-band image of the rain forest in Belize. Belize provides the reference which is a fixed value of the system; it is then possible to determine the topography of other areas with the help of this reference. The Belize area is completely homogeneous and flat. The course of the cross-talk as a function of the nadir angle, determined on the basis of this area, provides the reference as shown in FIG. 3. Cross-talk data from other areas are then compared with this reference and from this the angle information and in a further sequence the topography are derived, which is analogous to the topography shown in FIG. 4A.

The accuracy of the polarimetric method for a mean elevation error and for a standard deviation from the elevation error which can be inferred from the diagram in FIG. 5 is sufficient for performing the correction of an antenna pattern in an adequate manner. However, the local angle of incidence cannot be determined because of the lack of sensitivity, in particular in the far range, for example in FIG. 1 at an angle of more than 45.

The above described possibility of use can be improved if a monopulse system is employed in place of co- and cross-polar antenna patterns of an SAR polarimeter.

The most important element of the monopulse system is an antenna which is formed by a plurality of individual radiators which are divided into an upper and a lower half in the elevation direction. If both halves are fed in phase, the conventional elevation pattern is obtained, which is designated a sum pattern. A so-called difference pattern results, if one half is fed phase-shifted by 180.

In FIG. 6 an advantageous realization of a monopulse antenna in X-band is shown schematically in FIG. 6. Microstrip elements are used as individual radiators here and a 3 dB hybrid coupler is used in the feed network (FIG. 7). Such a feed network for a monopulse antenna is statically represented in FIG. 7. The respective amplitudes, namely 0.25, 0.35, 0.5, 0.7 and 1.0, are entered in the feed network of FIG. 7, and in FIG. 6 the individual radiators to which the same different amplitudes have been assigned are identified by different symbols, the association between the symbols and the normalized amplitude value being indicated at the right top in FIG. 6. The separation line between the two halves is indicated by a dash-dotted line in the arrangement of FIG. 6.

Cuts through sum and difference patterns in the elevation direction are represented in FIG. 8. In this case the strong dependence of the difference pattern on the antenna angle in the area of the zero position, which is required for an application intended by applicant, can be clearly seen in FIG. 8. Sum and difference patterns have respectively the same polarization. In this case the difference pattern is point-symmetrical around the antenna angle 0 which, however, cannot be seen in the representation of FIG. 8, because it lies in the power range.

An SAR system with two receiver channels is required for an actual embodiment. In this case the echo with the mentioned phase shift between the two feed lines is received with the one channel, and without phase shift in the other channel. The data received in this way are processed into two images which only differ in the radiometric modulation which one time is represented by the difference pattern and another by the sum pattern.

Alternatively to this it is also possible to use a system with one channel. However, this system must be capable of operating with the doubled pulse repetition frequency (PRF) and can record every second pulse with the difference pattern. The data of even and odd pulses are again processed into two images which are completely correlated because of sampling at the doubled Nyquist frequency. If now the quotient of these two images is formed, any effects of the target can be eliminated inclusive speckle. (Speckle occurs because of the coherence of the radar signals and is manifested by statistical fluctuations in the SAR image).

We claim:

1. A terrain-mapping airborne synthetic aperture radar system for an aircraft travelling in an x-axis direction of flight at a z-axis elevation over a target, the target being a point of terrain, the x-axis direction being transverse to a y-axis direction; the system comprising:

a monopulse radar antenna including a set of radiating elements, the x-axis direction lying within the antenna plane, the antenna plane being inclined to the z-axis direction at an angle α;

means for distributing radar pulses to the radiating elements in a way that radiating elements are separated into two antenna halves in the antenna plane above and below a symmetry line parallel to the x-axis direction;

on a transmitting side, means for distributing radar pulses to the antenna halves such that the antenna halves transmit the pulses in phase;

means for detecting echo pulses returned from the target to the radiating elements to generate return signals therefrom;

first processing means for determining a target range by an echo delay of the return signals;

second processing means for determining an azimuthal target bearing by detecting a doppler shift of the return signals; and third processing means for means for determining a elevational target bearing; the third processing means further comprising:

on a receiving side, phase-shifting means for alternately phase-shifting by a phase angle φ, and not phase-shifting, received signals from the two antenna halves;

imaging means for generating two distinct synthetic-aperture radar images, the images including an out-of-phase image corresponding to a phase-shifted sequence of returned signals phase shifted by the phase angle φ of signals from the two antenna halves and an in-phase image corresponding to a non-shifted sequence of returned signals received without phase-shifting of signals from the two antenna halves;

dividing means for taking a quotient of intensities of corresponding target image pixels of selectively the in-phase image and the out-of-phase image, the quotient being a function of φ and a nadir target bearing angle θ between the z-axis direction and the target; and angle-determining means for determining from the quotient a nadir target bearing angle θ between the z-axis direction and the target, θ being equal to 90 degrees-α;

whereby the ground topography may be determined as a map of target image pixels in three dimensions of range, azimuthal angle, and nadir angle.

2. The system according to claim 1, wherein the radiating elements of the monopulse radar antenna are microstrip elements.

3. The system according to claim 1, wherein the phase angle φ is 180 degrees, the out-of-phase image is a difference pattern image, and the in-phase image is a sum pattern image.

\* \* \* \* \*